(12) United States Patent
Yu et al.

(10) Patent No.: US 12,242,541 B1
(45) Date of Patent: Mar. 4, 2025

(54) MANAGING RANKING OF DATA IN VISUALIZATIONS BASED ON MULTIPLE DIMENSIONS

(71) Applicant: SAP SE, Walldorf (DE)

(72) Inventors: Jie Yu, Port Moody (CA); Pai Zhang, Burnaby (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/459,193

(22) Filed: Aug. 31, 2023

(51) Int. Cl.
*G06F 16/00* (2019.01)
*G06F 16/242* (2019.01)
*G06F 16/2453* (2019.01)
*G06F 16/2458* (2019.01)
*G06F 16/248* (2019.01)
(Continued)

(52) U.S. Cl.
CPC ...... *G06F 16/9038* (2019.01); *G06F 16/2425* (2019.01); *G06F 16/2428* (2019.01); *G06F 16/24534* (2019.01); *G06F 16/24539* (2019.01); *G06F 16/2477* (2019.01); *G06F 16/248* (2019.01); *G06F 16/287* (2019.01)

(58) Field of Classification Search
CPC .............. G06F 16/9038; G06F 16/242; G06F 16/2425; G06F 16/24539; G06F 16/26; G06F 16/2477; G06F 16/248; G06F 16/287; G06F 16/2462; G06F 16/283; G06F 16/2428; G06F 16/24534
See application file for complete search history.

(56) References Cited

U.S. PATENT DOCUMENTS

| | | | |
|---|---|---|---|
| 2016/0034544 A1* | 2/2016 | Ramanujan | G06F 16/248 707/722 |
| 2016/0103914 A1* | 4/2016 | Im | G06F 16/951 707/770 |
| 2017/0193024 A1* | 7/2017 | Fung | G06F 16/248 |

(Continued)

FOREIGN PATENT DOCUMENTS

WO  WO 2021050182 A1 *  3/2021
WO  WO 2021111400 A1 *  6/2021

OTHER PUBLICATIONS

E. Wohlfart et al., "Comparing Information Visualization Tools Focusing on the Temporal Dimensions", 12th International Conference Information Visualisation (Jul. 2008, pp. 69-74).*

(Continued)

*Primary Examiner* — Srirama Channavajjala
(74) *Attorney, Agent, or Firm* — Fountainhead Law Group, PC

(57) ABSTRACT

Some embodiments provide a non-transitory machine-readable medium that stores a program. The program may generate a visualization comprising a set of data from a data model. The set of data comprises a set of measure values categorized according to a plurality of dimensions. The program may receive a request to rank the set of measure values based on a first dimension in the plurality of dimensions and a second dimension in the plurality of dimensions. The program may in response to receiving the request, generating a query for a subset of the set of data for the visualization. The query comprises a set of conditions. The program may send the query to a computing system for processing. The program may receive, from the computing system, the subset of the set of data. The program may update the visualization to include the subset of the set of data.

14 Claims, 13 Drawing Sheets

(51) Int. Cl.
*G06F 16/28* (2019.01)
*G06F 16/9038* (2019.01)

(56) References Cited

U.S. PATENT DOCUMENTS

| | | | |
|---|---|---|---|
| 2017/0193116 A1* | 7/2017 | Wong | G06F 16/248 |
| 2018/0173754 A1* | 6/2018 | Kumar | G06F 16/24535 |
| 2020/0125559 A1* | 4/2020 | Talbot | G06F 16/2456 |
| 2021/0224299 A1* | 7/2021 | Karlapalem | G06F 16/2462 |
| 2023/0113933 A1* | 4/2023 | Beers | G06F 16/248 |
| | | | 707/722 |

OTHER PUBLICATIONS

Shusen Liu et al., "Visualizing High-Dimensional Data: Advances in the Past Decade", IEEE Transactions on Visualization and Computer Graphics (vol. 23, Issue: 3, 2017, pp. 1249-1268).*

* cited by examiner

MANAGING RANKING OF DATA IN VISUALIZATIONS BASED ON MULTIPLE DIMENSIONS

BACKGROUND

Many software applications utilize data that is stored in databases. In order to obtain such data, a software application typically generates a query for the desired data and sends the query to the database for processing. In return, the software application receives the requested data. In some cases, the data stored in the database may be organized according to measures and dimensions. In some such cases, the software application may want the data that it requested to be ranked according to one or more dimensions.

SUMMARY

In some embodiments, the techniques described herein relate to a non-transitory machine-readable medium storing a program executable by at least one processing unit of a device, the program including sets of instructions for: generating a visualization including a set of data from a data model, wherein the set of data includes a set of measure values categorized according to a plurality of dimensions; receiving a request to rank the set of measure values based on a first dimension in the plurality of dimensions and a second dimension in the plurality of dimensions; in response to receiving the request, generating a query for a subset of the set of data for the visualization, wherein the query includes a set of conditions defined based on the request; sending the query to a computing system for processing; receiving, from the computing system, the subset of the set of data; and updating the visualization to include the subset of the set of data.

In some embodiments, the techniques described herein relate to a non-transitory machine-readable medium, wherein the request specifies to rank the set of measure values based on the first dimension and the second dimension together.

In some embodiments, the techniques described herein relate to a non-transitory machine-readable medium, wherein the set of conditions includes a condition specifying to evaluate measure values based on the first dimension and the second dimension.

In some embodiments, the techniques described herein relate to a non-transitory machine-readable medium, wherein the request specifies to rank the set of measure values based on the first dimension and the second dimension separately.

In some embodiments, the techniques described herein relate to a non-transitory machine-readable medium, wherein the set of conditions includes a first condition specifying to evaluate measure values based on the first dimension and a second condition specifying to evaluate measure values based on the second dimension.

In some embodiments, the techniques described herein relate to a non-transitory machine-readable medium, wherein receiving the request includes receiving, through a graphical user interface (GUI) provided by the computing system, a selection of a rank option.

In some embodiments, the techniques described herein relate to a non-transitory machine-readable medium, wherein receiving, through the GUI, selection of the rank option includes receiving a first selection of a first rank option for the first dimension in the plurality of dimensions and receiving a second selection of a second rank option for the second dimension in the plurality of dimensions.

In some embodiments, the techniques described herein relate to a method including: generating a visualization including a set of data from a data model, wherein the set of data includes a set of measure values categorized according to a plurality of dimensions; receiving a request to rank the set of measure values based on a first dimension in the plurality of dimensions and a second dimension in the plurality of dimensions; in response to receiving the request, generating a query for a subset of the set of data for the visualization, wherein the query includes a set of conditions defined based on the request; sending the query to a computing system for processing; receiving, from the computing system, the subset of the set of data; and updating the visualization to include the subset of the set of data.

In some embodiments, the techniques described herein relate to a method, wherein the request specifies to rank the set of measure values based on the first dimension and the second dimension together.

In some embodiments, the techniques described herein relate to a method, wherein the set of conditions includes a condition specifying to evaluate measure values based on the first dimension and the second dimension.

In some embodiments, the techniques described herein relate to a method, wherein the request specifies to rank the set of measure values based on the first dimension and the second dimension separately.

In some embodiments, the techniques described herein relate to a method, wherein the set of conditions includes a first condition specifying to evaluate measure values based on the first dimension and a second condition specifying to evaluate measure values based on the second dimension.

In some embodiments, the techniques described herein relate to a method, wherein receiving the ranking option includes receiving, through a graphical user interface (GUI) provided by the computing system, a selection of the ranking option.

In some embodiments, the techniques described herein relate to a method, wherein receiving, through the GUI, selection of the rank option includes receiving a first selection of a first rank option for the first dimension in the plurality of dimensions and receiving a second selection of a second rank option for the second dimension in the plurality of dimensions.

In some embodiments, the techniques described herein relate to a system including: a set of processing units; and a non-transitory machine-readable medium storing instructions that when executed by at least one processing unit in the set of processing units cause the at least one processing unit to: generate a visualization including a set of data from a data model, wherein the set of data includes a set of measure values categorized according to a plurality of dimensions; receive a request to rank the set of measure values based on a first dimension in the plurality of dimensions and a second dimension in the plurality of dimensions; in response to receiving the request, generate a query for a subset of the set of data for the visualization, wherein the query includes a set of conditions defined based on the request; send the query to a computing system for processing; receive, from the computing system, the subset of the set of data; and update the visualization to include the subset of the set of data.

In some embodiments, the techniques described herein relate to a system, wherein the request specifies to rank the set of measure values based on the first dimension and the second dimension together.

In some embodiments, the techniques described herein relate to a system, wherein the set of conditions includes a condition specifying to evaluate measure values based on the first dimension and the second dimension.

In some embodiments, the techniques described herein relate to a system, wherein the request specifies to rank the set of measure values based on the first dimension and the second dimension separately.

In some embodiments, the techniques described herein relate to a system, wherein the set of conditions includes a first condition specifying to evaluate measure values based on the first dimension and a second condition specifying to evaluate measure values based on the second dimension.

In some embodiments, the techniques described herein relate to a system, wherein receiving the ranking option includes receiving, through a graphical user interface (GUI) provided by the computing system, a selection of the ranking option.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for managing ranking of data in visualizations based on multiple dimensions. In some embodiments, a system includes a client device and a computing system. The computing device can provide the client device with visualizations (e.g., charts, graphs, tables, etc.) of data organized according to measures and dimensions. For a visualization, a user of the client device may specify what data is used in the visualization. For example, a user of the client device can specify a measure and several dimensions according to which values of the measure are organized. In some instances, the user of the client device may select an option to rank the values of the measure based on the several dimensions. In response to receiving the selection of the option, the client device generates a query for the ranked data. In some embodiments, the query includes parameters (e.g., a set of conditions) that facilitate the computing system in retrieving the ranked data from the database/storage where the data is stored. Next, the client device sends the query to the computing system. Upon receiving the request, the computing system processes the query and retrieves the requested ranked data. Then, the computing system sends the ranked data to the client device. When the client device receives the ranked data, the client device updates the visualization with the ranked data.

The techniques described in the present application provide a number of benefits and advantages over conventional methods for managing data in visualizations. For instance, including parameters in a query for ranked data that facilitates the computing system in retrieving the ranked data allows the computing system to retrieve only the requested ranked data from the database/storage, thereby reducing bandwidth utilization. Conventional methods that do not support such parameters may achieve the same result by retrieving a larger set of data than the requested ranked data from the database/storage and then performing some additional post-query processing to identify the requested ranked data from the larger set of data.

Figure 1:
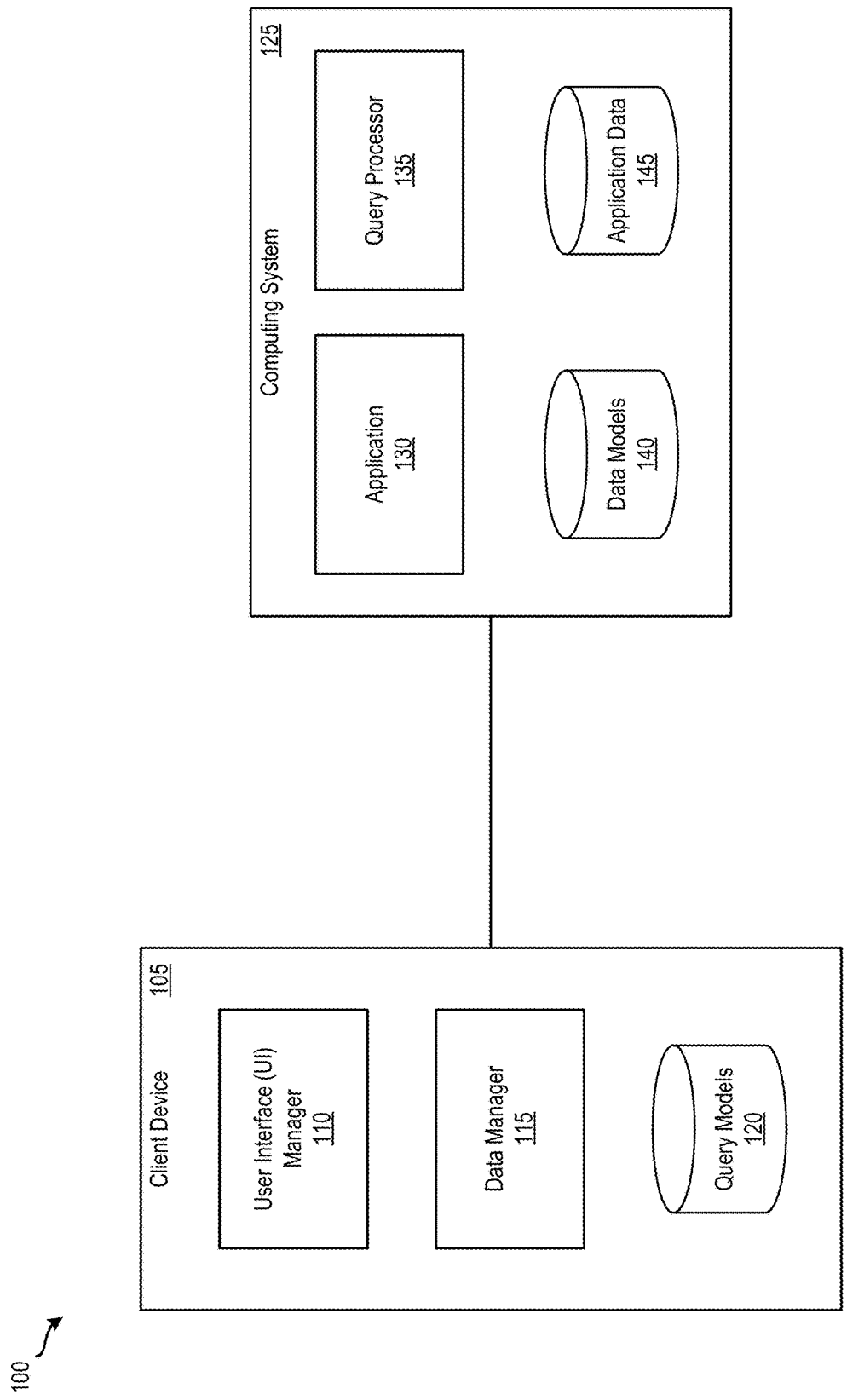
FIG. 1 illustrates a system for managing ranking of data in visualizations based on dimensions according to some embodiments.

FIG. 1 illustrates a system for managing ranking of data in visualizations based on dimensions according to some embodiments. As shown, system 100 includes client device 105 and computing system 125. Client device 105 is configured to interact with computing system 125. As depicted in FIG. 1, client device 105 includes user interface (UI) manager 110, data manager 115, and query models storage 120. Query models storage 120 stores query models. In some embodiments, a query model is a software object that represents a query for data for a corresponding visualization. A set of measures and/or dimensions in a data model can be specified to be used for displaying data in a visualization. A query model associated with such a visualization represents a query for the specified set of measures and/or dimensions.

UI manager 110 is responsible for managing a graphical user interface (GUI) provided on client device 105 (e.g., displayed on a display of client device 105). For instance, UI manager 110 may receive a GUI from application 130, which UI manager 110 provides on client device 105 (e.g., displays on a display of client device 105). Additionally, UI manager 110 may be configured to manage user input received through the GUI. For example, when UI manager 110 detects user input indicating a modification to a visualization in a manner that changes the underlying data of the visualization, UI manager 110 forwards the user input to data manager 115. In return, UI manager 110 may receive from data manager 115 a set of new data for the visualization. In response to receiving the new data, UI manager 110 updates the visualization with the new data.

Data manager 115 is configured to manage data for visualizations provided on client device 105. For instance, data manager 115 may receive from UI manager 110 user input indicating a modification to a visualization that effects the underlying data of the visualization. In response, data manager 115 accesses query models storage 120 to retrieve a query model associated with the visualization. Based on the user input, data manager 115 modifies the query model associated with the visualization so that the query model includes the modification to the underlying data of the visualization. Next, data manager 115 generates a query based on the query model. Data manager 115 then sends the generated query to computing system 125. In return, data manager 115 receives from computing system 125 a set of new data for the visualization. Data manager 115 forwards the set of new data to UI manager 110.

As illustrated in FIG. 1, computing system 125 includes application 130, query processor 135, data models storage 140, and application data storage 145. Data models storage 140 is configured to store data models. In some embodiments, a data model defines how elements of data are to be organized. Any number of different types of data models can be used to organize data. For example, one type of data model defines data to be organized according to measures and dimensions. In some embodiments, a measure is a field that is configured to store quantitative (e.g., numeric) data whereas a dimension is a field that is configured to store qualitative data. Values stored in a measure can be referred to as measure values and values stored in dimensions can be referred to as dimension values. In some embodiments, a dimension is configured to categorize measures based on the dimension values of the dimension. Application data storage 145 stores data generated by, accessed by, associated with, etc., application 130. In some cases, such data is organized according to a data model in data models storage 140.

In some embodiments, data models storage 140 and application data storage 145 are implemented in a single physical storage while, in other embodiments, data models storage 140 and application data storage 145 may be implemented across several physical storages. While FIG. 1 shows data models storage 140 and application data storage 145 as part of computing system 125, one of ordinary skill in the art will appreciate that data models storage 140 and/or application data storage 145 may be external to computing system 125 in some embodiments.

Application 130 is a software application operating on computing system 125 configured to interact with client device 105. For example, application 130 may provide, via a GUI, visualizations of data to client device 105. Through the GUI, application 130 can receive queries for different data for the visualizations. Upon receiving such a query, application 130 sends it to query processor 135 for processing. When application 130 receives the requested data from query processor 135, application 130 provides, via the GUI, the data to client device 105.

Query processor 135 handles the processing of queries. For instance, query processor 135 may receive a query from application 130. In response, query processor 135 executes the query represented by the query model by accessing application data storage 145 and retrieving the data specified in the query. Once query processor 135 finishes executing the query, query processor 135 sends application 130 the retrieved data.

Figure 2A:
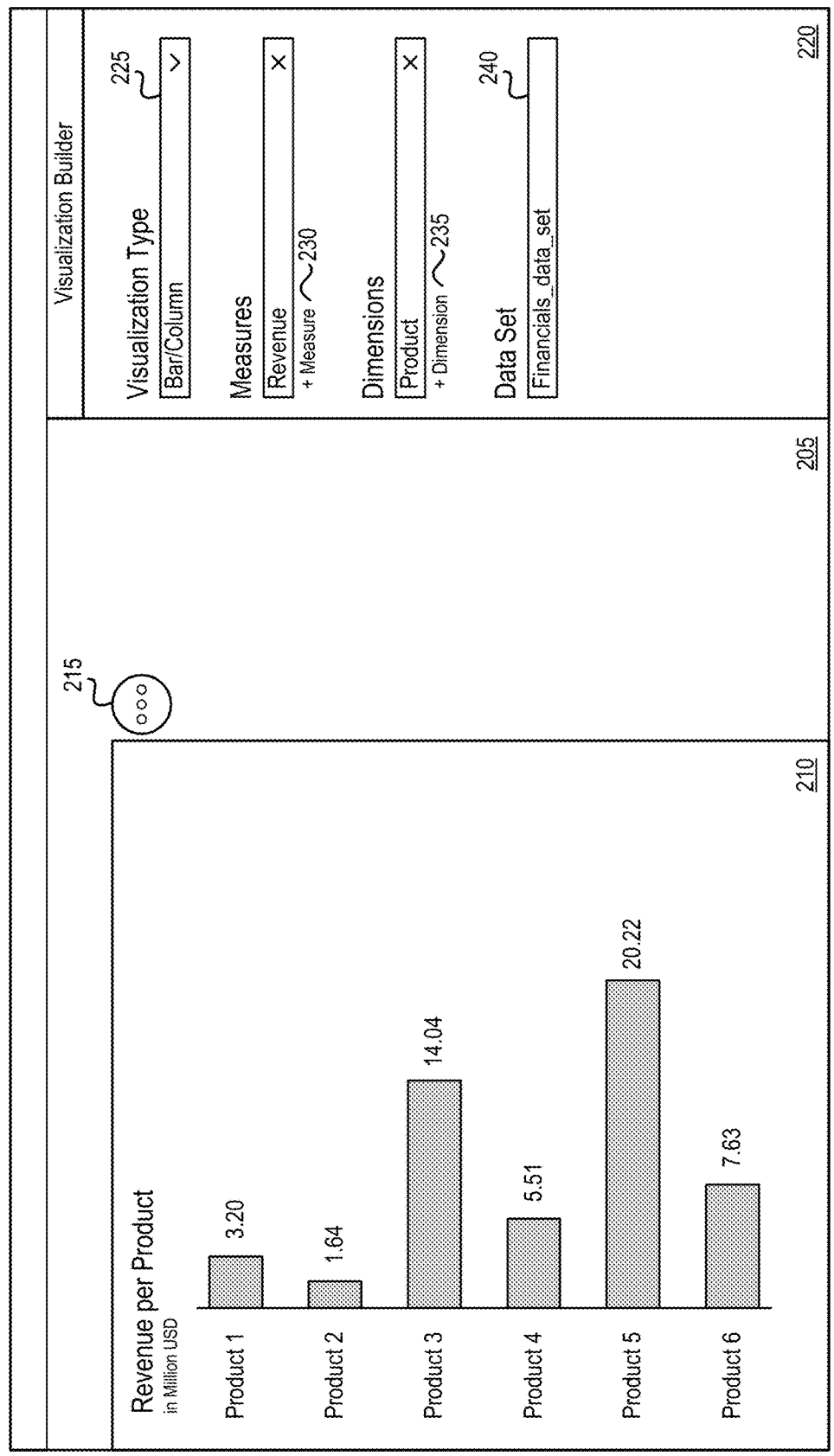
FIGS. 2A-2D illustrate an example of ranking of data based on dimensions according to some embodiments.

Several example operations will now be described by reference to FIGS. 1-5. A first example demonstrates how a rank option selected for several dimensions in a visualization is processed. For this first example, a user of client device 105 has specified a measure and a dimension in a data model to be used for a visualization. FIGS. 2A-2D illustrate an example of ranking of data based on dimensions according to some embodiments. Specifically, FIGS. 2A-2D illustrate an example of ranking dimensions for data in a visualization provided in a GUI 200. For this example, application 130 provides GUI 200 to client device 105, which, in turn, provides GUI 200 (e.g., on a display of client device 105) to the user of client device 105. FIG. 2A illustrates GUI 200 after the user of client device 105 specified the measure and the dimension. As shown in FIG. 2A, GUI 200 includes display area 205 and display area 220. Display area 205 is configured to display visualizations of data. Here, display area 205 is displaying visualization 210 and user interface (UI) control 215. In this example, visualization 210 is a visualization that displays a bar chart of data organized according to revenue (a measure) per product (a dimension) in terms of millions of US dollars (USD). Specifically, visualization 210 shows a bar chart of revenue for six products (Products 1-6). UI control 215 is a selectable UI element that, when selected, provides several options associated with visualization 210.

Display area 220 is for providing a tool for building visualizations (e.g., visualization 210). As depicted, display area 220 includes UI controls 225-240. UI control 225 is a selectable a drop-down list control for selecting a type of visualization. For this example, the user of client device 105 has used UI control 225 to select a Bar/Column type of visualization for visualization 210. UI control 230 is a selectable UI element for adding a measure to visualization 210. UI control 235 is a selectable UI element for adding a dimension to visualization 210. UI control 240 is a selectable UI element for selecting a data set for visualization 210. As shown, the user of client device 105 has selected a financials data set for visualization 210. In this example, the data in the financials data set is organized according to a data model that specifies data to be organized based on a set of measures and a set of dimensions.

The first example operation begins by a user of client device 105 specifying a second dimension (Region in this example) in the data model be used for visualization 210. When UI manager 110 receives the input, UI manager 110 forwards them to data manager 115. Once data manager 115 receives the input, data manager 115 accesses query models storage 120 to retrieve the query model associated with visualization 210. Next, data manager 115 modifies the query model by adding the second dimension to the query model. Data manager 115 then generates a query based on the query model and sends the generated query to application 130, which forwards it to query processor 135. In response to receiving the query, query processor 135 processes the query by accessing application data storage 145 to retrieve a set of data specified in the query. Then, query processor 135 sends the requested set of data to application 130, which forwards it to data manager 115. Data manager 115 sends the set of data to UI manager 110, which updates visualization 210 with the set of data.

Figure 2B:
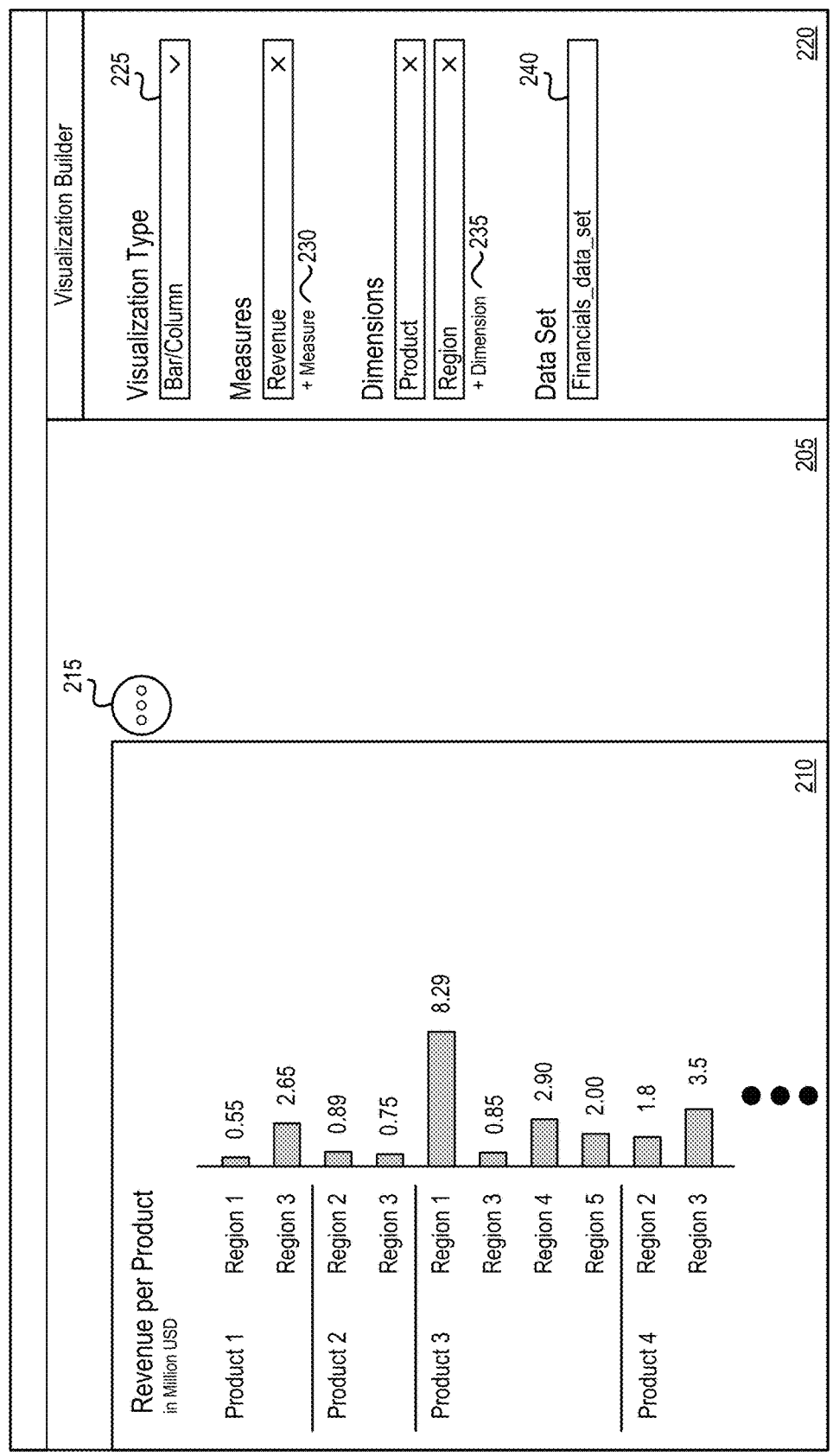

FIG. 2B illustrates GUI 200 after UI manager 110 updates visualization 210 with the set of data that includes the second dimension. As illustrated, visualization 210 in FIG. 2B shows a bar chart similar to that one depicted in FIG. 2A except the data is organized according to revenue (a measure) per product (a first dimension) and region (a second dimension). After the user of client device 105 adds the second dimension to visualization 210, the user of client device 105 selects UI control 215 to cause UI manager 110 to display several options associated with visualization 210.

Figure 2C:
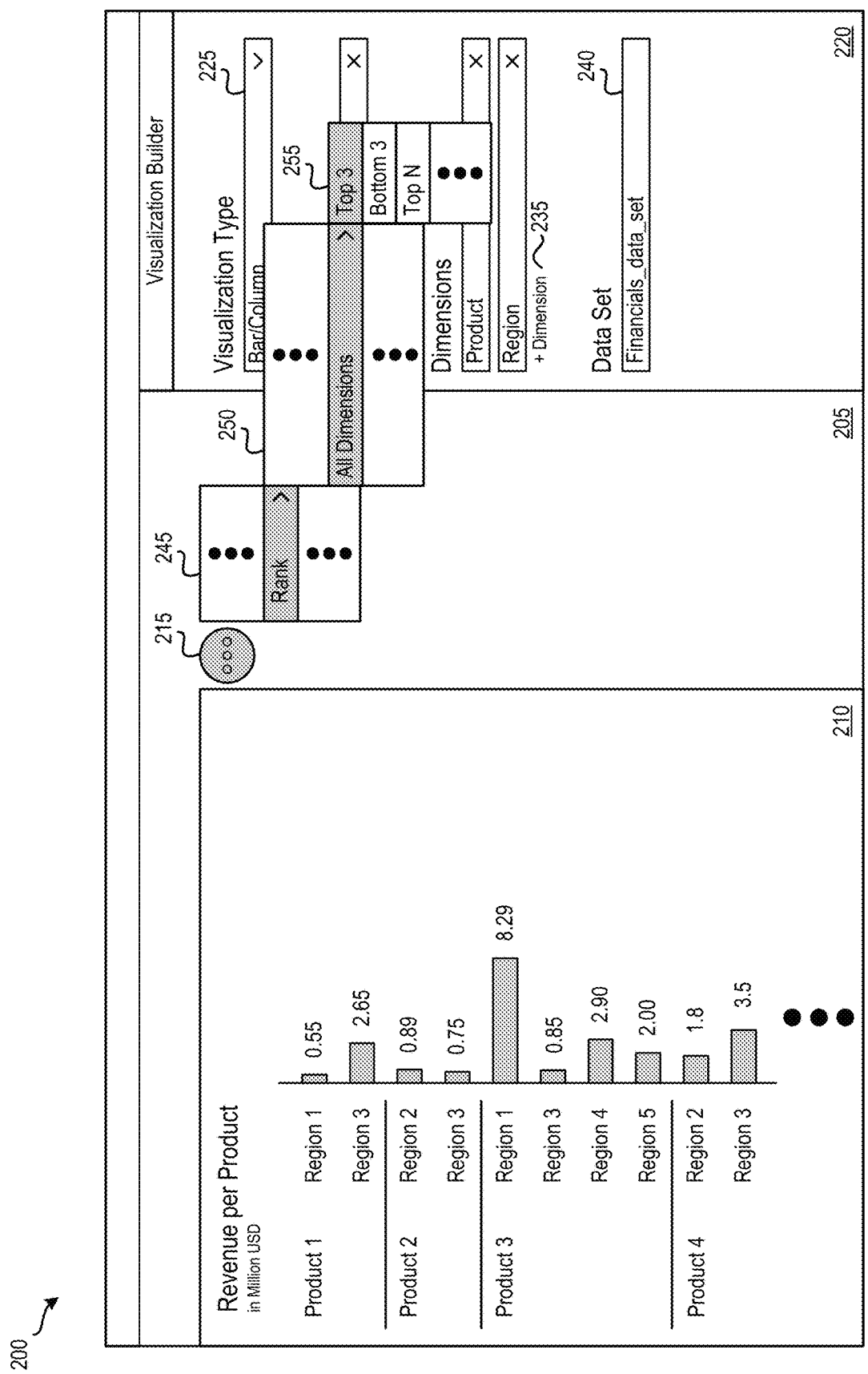

FIG. 2C illustrates GUI 200 after UI manager 110 displays the several options associated with visualization 210. As shown in FIG. 2C, UI control 215 is highlighted gray to indicate the user of client device 105 selected UI control 215. In response to the selection of UI control 215, UI manager 110 displays option panel 245, which includes a rank option. For this example, the user of client device 105 selects the rank option, which causes UI manager 110 to display option panel 250. As depicted in FIG. 2C, option panel 250 includes a rank option for ranking all dimensions. The user of client device 105 selects the rank option for all dimensions, which causes UI manager 110 to display option panel 255. Option panel 255 includes several ranking options for ranking all dimensions: a "Top 3" option, a "Bottom 3" option, and a "Top N" option, among others. The "Top 3" option is for displaying the highest three revenue measure values categorized according to the product and region dimensions, the "Bottom 3" option is for displaying the lowest three revenue measure values categorized according to the product and region dimensions, and the "Top N" option is similar to the "Top 3" option except it allows a user (e.g., the user of client device 105) to specify the number of the highest revenue measure values categorized according to the product and region dimensions.

Figure 2D:
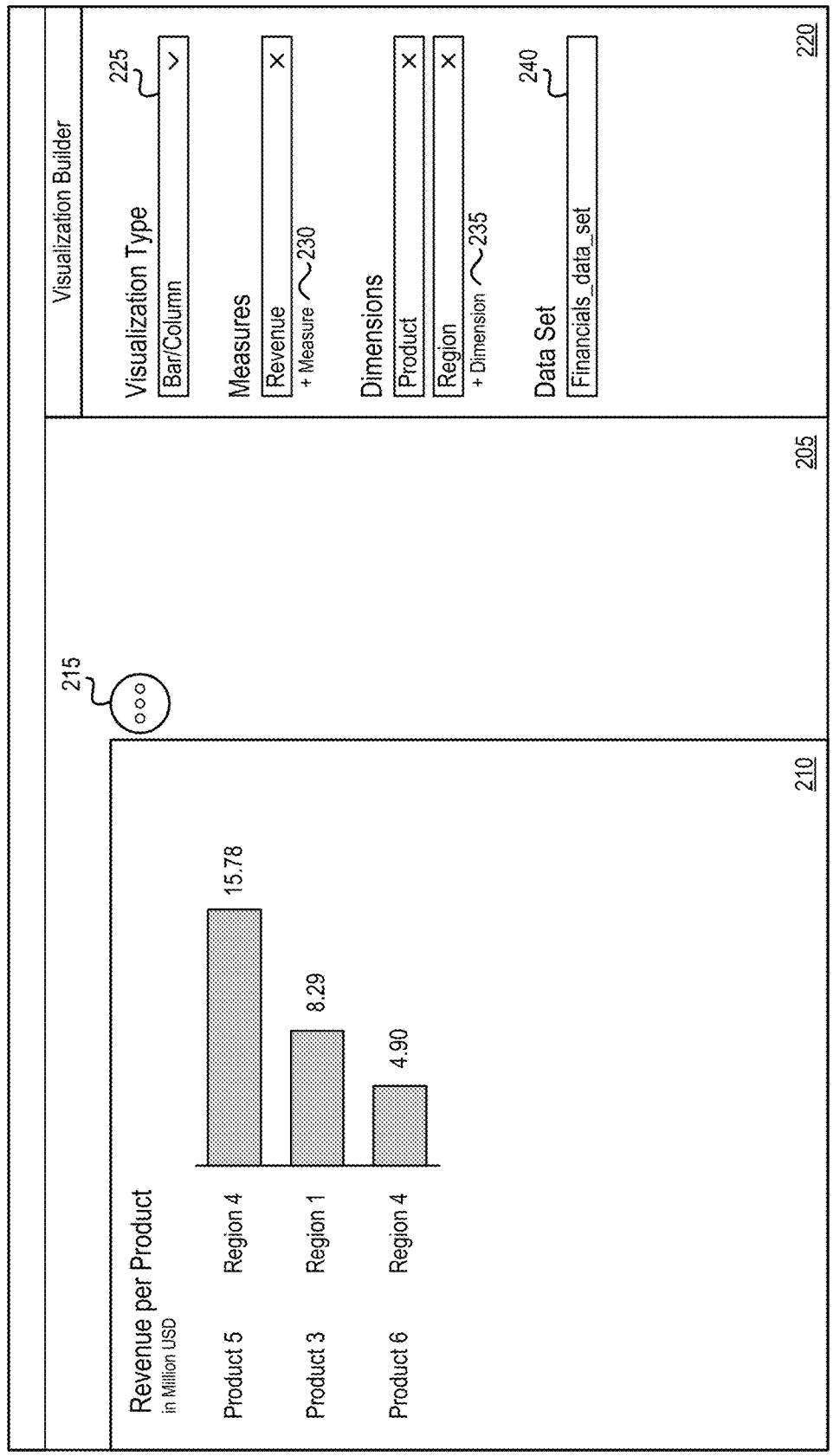
Figure 3:
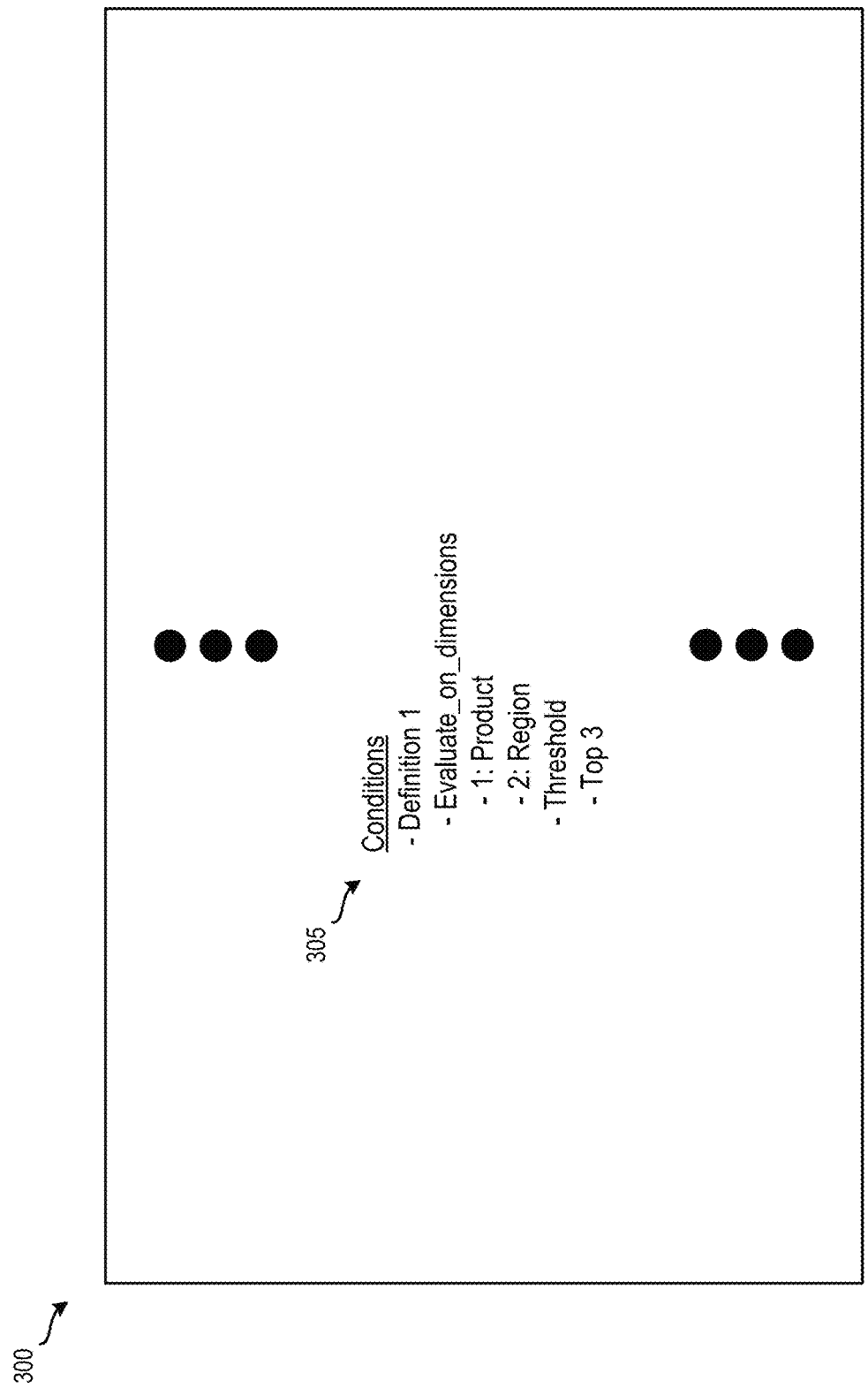
FIG. 3 illustrates a set of conditions in a query for the example illustrated in FIGS. 2A-2D according to some embodiments.

In this example, the user of client device 105 selects the "Top 3" option. In response to receiving the selection of the "Top 3" option, UI manager 110 determines that the user input indicates a modification to visualization 210 in a manner that changes the underlying data of visualization 210. Thus, UI manager 110 forwards the user input to data manager 115. In response to receiving the user input from UI manager 110, data manager 115 accesses query models storage 120 to retrieve a query model associated with visualization 210. Based on the user input, data manager 115 modifies the query model associated with visualization 210 so that the query model includes the selected rank option. Data manager 115 then generates a query based on the query model. In some embodiments, the selected rank option is represented in the generated query in the form of a set of conditions. FIG. 3 illustrates a set of conditions in a query 300 for the example illustrated in FIGS. 2A-2D according to some embodiments. In particular, query 300 is the query that data manager 115 generates for this example. As depicted in FIG. 3, query 300 includes set of conditions 305. Set of conditions 305 includes one definition that specifies the Product dimension and the Region dimension for an "Evaluate_on_dimension" attribute. In addition, the definition in set of conditions 305 specifies Top 3 for a "Threshold" attribute.

After generating query 300, data manager 115 sends query 300 to application 130. When application 130 receives query 300, application 130 forwards it to query processor 135 for processing. In response to receiving query 300, query processor 135 executes query 300 by accessing application data storage 145 and retrieving the data specified in the query. Here, query processor 135 retrieves from application data storage 145 the highest three revenue measure values categorized according to the product and region dimensions. Query processor 135 sends these three measure values to application 130, which application 130 forwards to data manager 115. Upon receiving the data, data manager 115 sends it to UI manager 110. When UI manager 110 receives the data, UI manager updates visualization 210 to include the newly received data. FIG. 2D illustrates GUI 200 after UI manager 110 updates visualization 210 with the newly received data. As illustrated, visualization 210 in FIG. 2D shows a bar chart that includes the highest three measure values for the revenue measure categorized according to the product dimension and the region dimension.

Figure 4A:
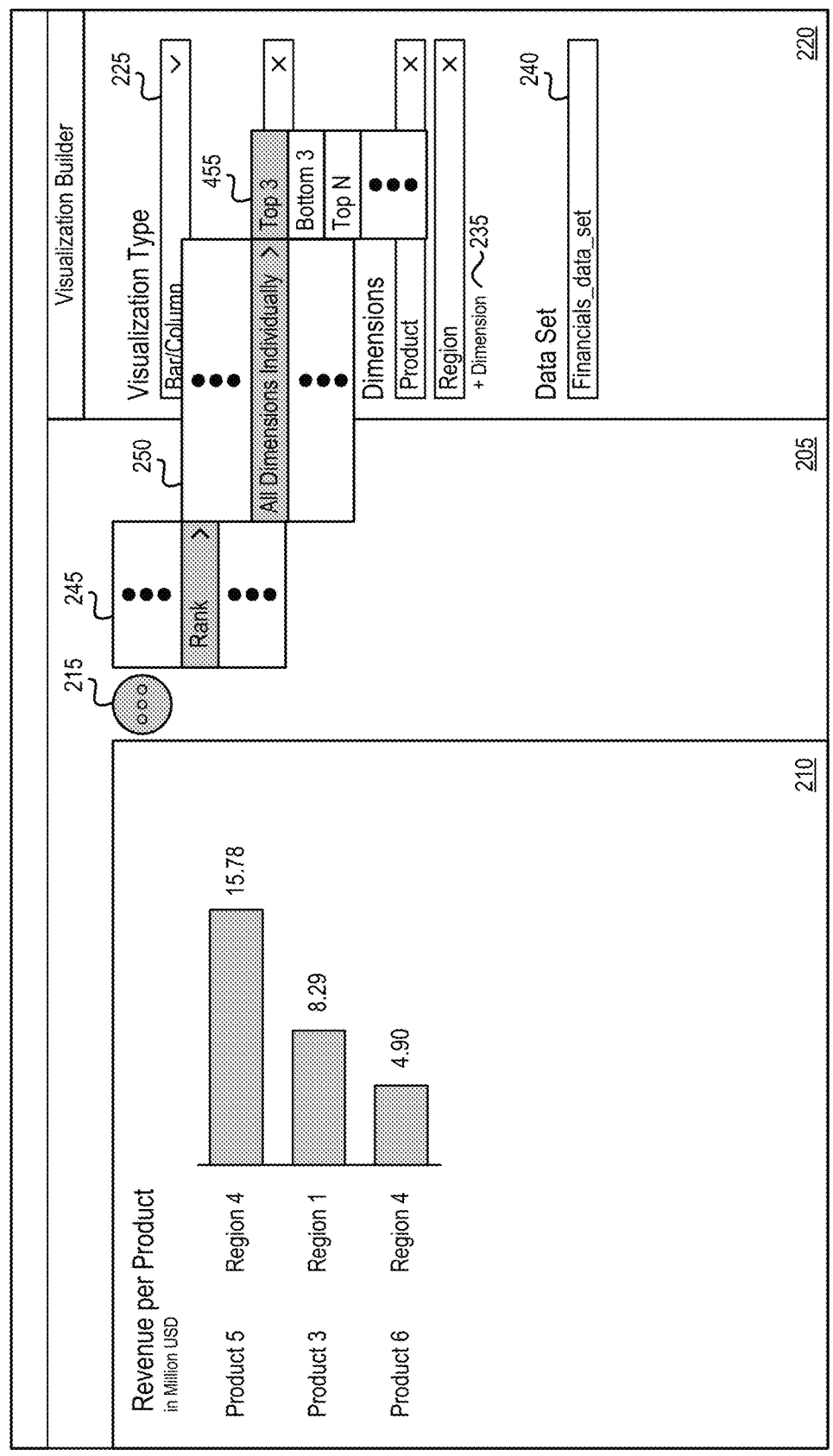
FIGS. 4A and 4B illustrate another example of ranking of data based on dimensions according to some embodiments.
Figure 4B:
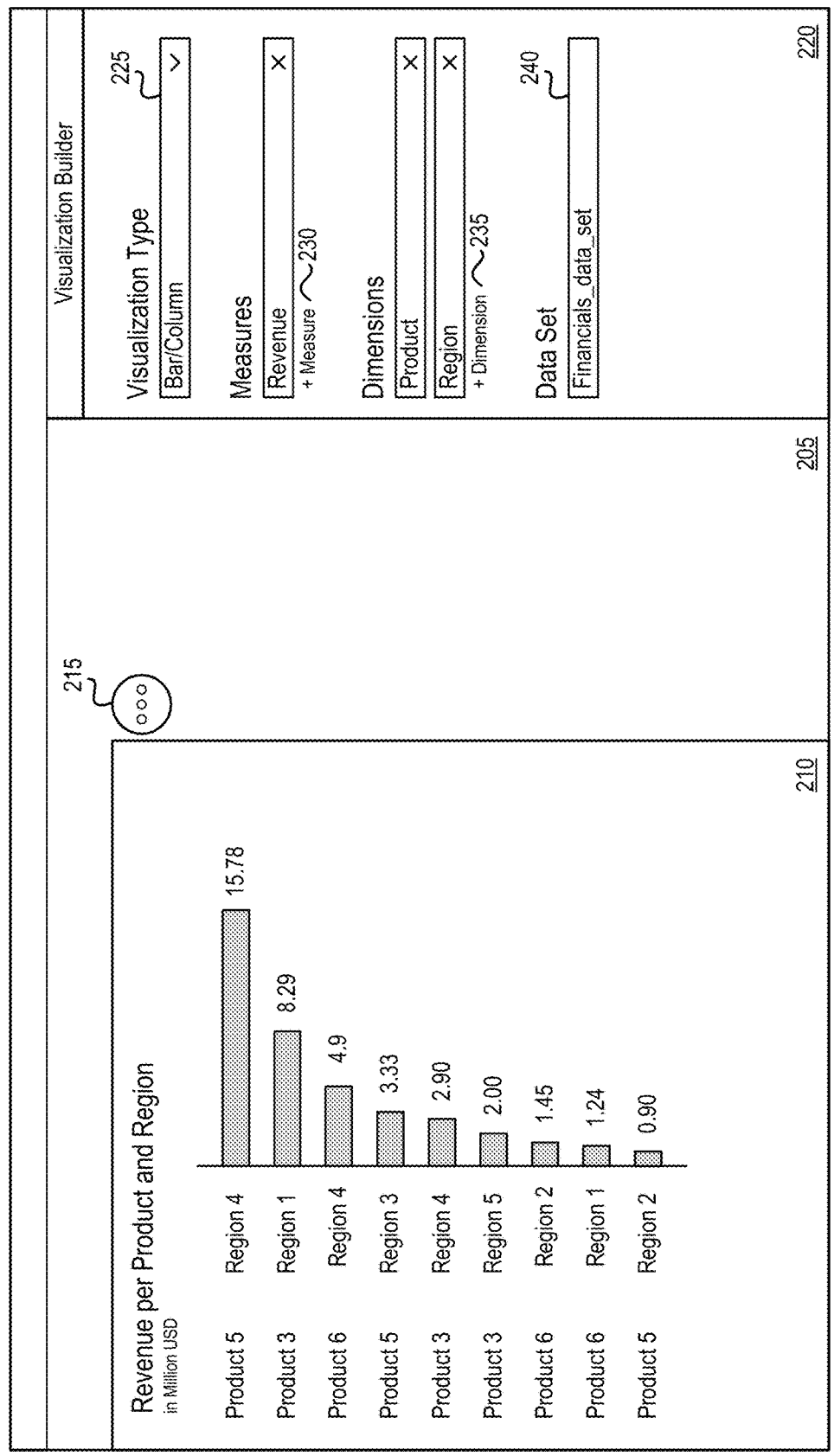

A second example demonstrates how a different rank option selected for several dimensions in a visualization is processed. The second example continues from the end of the first example. After UI manager 110 updates visualization 210 with the highest three revenue measure values, the user of client device 105 selects UI control 215 to cause UI manager 110 to display several options associated with visualization 210. FIGS. 4A and 4B illustrate another example of ranking of data based on dimensions according to some embodiments. In particular, FIG. 4A illustrates GUI 200 after UI manager 110 displays the several options associated with visualization 210. As illustrated in FIG. 4A, UI control 215 is highlighted gray to indicate the user of client device 105 selected UI control 215. In response to the selection of UI control 215, UI manager 110 displays option panel 245, which includes a rank option. Here, the user of client device 105 selects the rank option, which causes UI manager 110 to display option panel 250. As shown in FIG. 4A, option panel 250 includes a rank option for ranking all dimensions individually. The user of client device 105 selects the rank option for all dimensions individually, which causes UI manager 110 to display option panel 455. Option panel 455 includes several ranking options for ranking all dimensions individually: a "Top 3" option, a "Bottom 3" option, and a "Top N" option, among others. The "Top 3" option displays, for each of the highest three revenue measure values categorized according to the product dimension, the highest three revenue measure values categorized according to the region dimension. The "Bottom 3" option displays, for the lowest three revenue measure values categorized according to the product dimension, the lowest three revenue measure values categorized according to the region dimension, and the "Top N" option is similar to the "Top 3" option except it allows a user (e.g., the user of client device 105) to specify the number of the highest revenue measure values categorized according to the product and region dimensions separately.

For this example, the user of client device 105 selects the "Top 3" option in option panel 455. In response to the selection, UI manager 110 determines that the user input indicates a modification to visualization 210 in a manner that changes the underlying data of visualization 210. As such, UI manager 110 forwards the user input to data manager 115. Upon receiving the user input from UI manager 110, data manager 115 accesses query models storage 120 to retrieve a query model associated with visualization 210. Based on the user input, data manager 115 modifies the query model associated with visualization 210 so that the query model includes the selected rank option. Next, data manager 115 generates a query based on the query model. As mentioned above, in some embodiments, the selected rank option is represented in the generated query in the form of a set of conditions.

Figure 5:
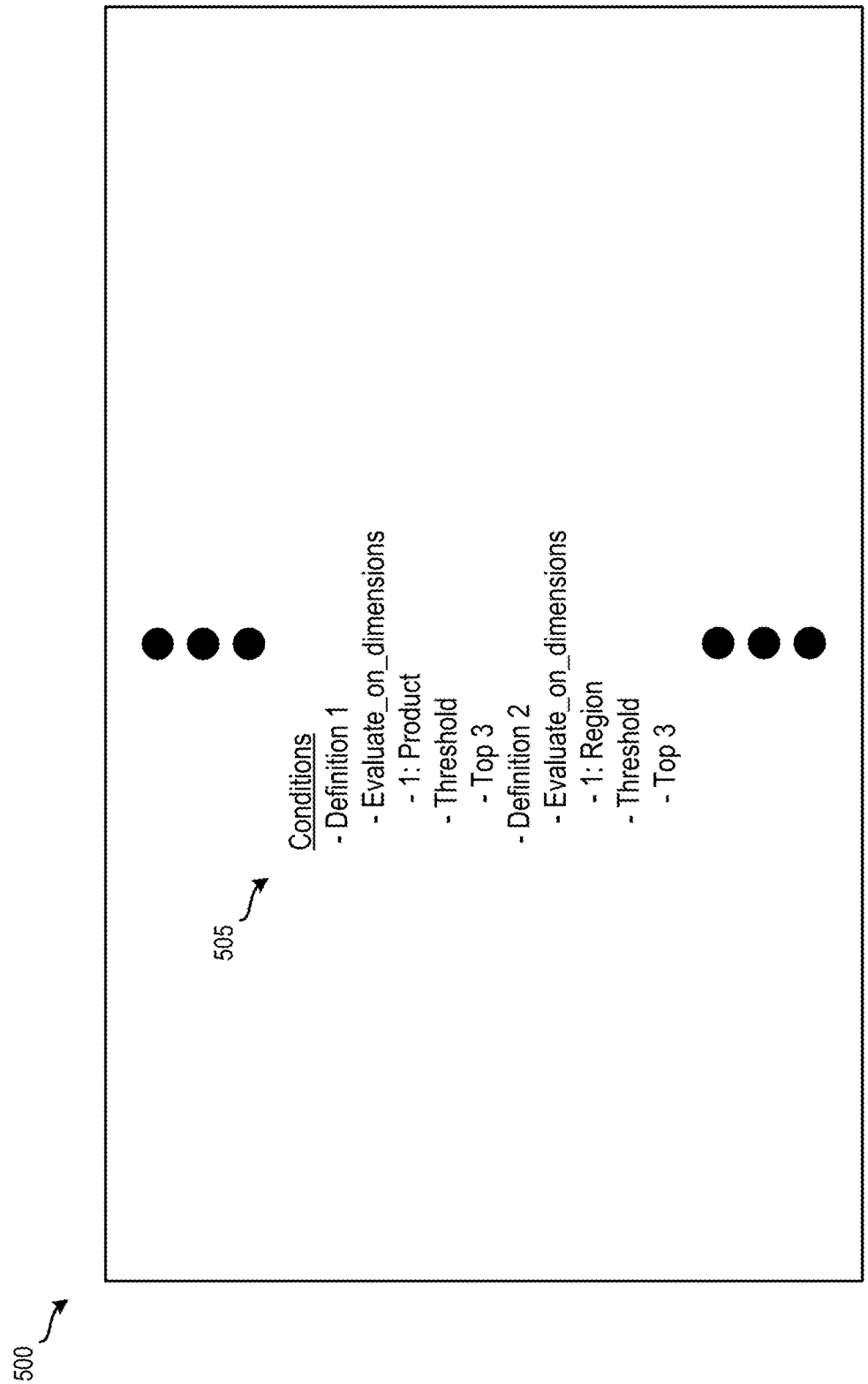
FIG. 5 illustrates a set of conditions in a query for the example illustrated in FIGS. 4A and 4B according to some embodiments.

FIG. 5 illustrates a set of conditions in a query 500 for the example illustrated in FIGS. 4A and 4B according to some embodiments. Specifically, query 500 is the query that data manager 115 generates in this example. As illustrated in FIG. 5, query 500 includes set of conditions 505. Set of conditions 505 includes two definitions. The first definition specifies the Product dimension for an "Evaluate_on_dimension" attribute. The first definition in set of conditions 505 also specifies Top 3 for a "Threshold" attribute. The second definition specifies the Region dimension for an "Evaluate_on_dimension" attribute. Additionally, the second definition in set of conditions 505 specifies Top 3 for a "Threshold" attribute.

Once data manager 115 generates query 500, data manager 115 sends query 500 to application 130. Upon receiving query 500, application 130 sends it to query processor 135 for processing. When query processor 135 receives query 500, query processor 135 executes query 500 by accessing application data storage 145 and retrieving the data specified in the query. In particular, query processor 135 determines the highest three revenue measure values categorized according to the product dimension. Then, for each of the highest three revenue measure values categorized according to the product dimension, query processor 135 retrieves the highest three revenue measure values categorized according to the region dimension. Query processor 135 sends the retrieved measure values to application 130, which application 130 forwards to data manager 115. Data manager 115 sends the measure values to UI manager 110, which updates visualization 210 to include the newly received data.

FIG. 4B illustrates GUI 200 after UI manager 110 updates visualization 210 with the newly received data. As depicted, visualization 210 in FIG. 4B shows a bar chart that includes, for each of the highest three revenue measure values categorized according to the product dimension, the highest three measure values for the revenue measure categorized according to the region dimension. For this example, Product 3, Product 5, and Product 6 have the highest three revenue measure values categorized according to the product dimension. For Product 3, the three highest measure values categorized according to the region dimension are in Region 1, Region 4, and Region 5. For Product 5, the three highest measure values categorized according to the region dimension are in Region 4, Region 3, and Region 2. For Product 6, the three highest measure values categorized according to the region dimension are in Region 4, Region 2, and Region 1. As shown in FIG. 4B, visualization 210 includes these measure values.

The example described above by reference to FIGS. 4A and 4B illustrates how a single rank option can be selected for several dimensions in a visualization. In some embodiments, the same result can be achieved through the selection of a rank option for each dimension. For example, GUI 200 may provide a first rank option (e.g., in option panel 250) for ranking the product dimension and a second rank option (e.g., in option panel 250) for ranking the region dimension. Receiving a selection of the first rank option causes UI manager 110 to display an option panel (e.g., similar to option panel 255 or 455) that includes several ranking options for ranking the product dimension (e.g., a "Top 3" option, a "Bottom 3" option, and a "Top N" option, etc.). Similarly, receiving a selection of the second rank option causes UI manager 110 to display an option panel (e.g., similar to option panel 255 or 455) that includes several ranking options for ranking the region dimension (e.g., a "Top 3" option, a "Bottom 3" option, and a "Top N" option, etc.). In this example, the same result as that depicted in FIG. 4B can be achieved by UI manager 110 receiving a selection of the first rank option for the product dimension and then subsequently receiving a selection of the second rank option for the region dimension.

The examples illustrated in FIGS. 2-5 show how the same rank option can be selected for two different dimensions (e.g., a Top 3 rank option for both the product dimension and the region dimension). One of ordinary skill in the art will understand that ranking options may be applied to any number of different dimensions. Additionally, one of ordinary skill in the art will appreciate that different rank options can be selected for different dimensions. For instance, a Top 3 rank option may be selected for the product dimension and a Bottom 3 rank option may be selected for the region dimension. Furthermore, the examples depicted in FIGS. 2-5 demonstrate how a rank option is applied to different dimensions for a single measure. One of ordinary skill in the art will recognize that the same and/or different rank options can be selected to be applied to different dimensions for different measures. For example, a Top 2 rank option can be selected to be applied to the product dimension for a revenue measure while a Top 4 rank option can be selected to be applied to the region dimension for a profit measure.

Figure 6:
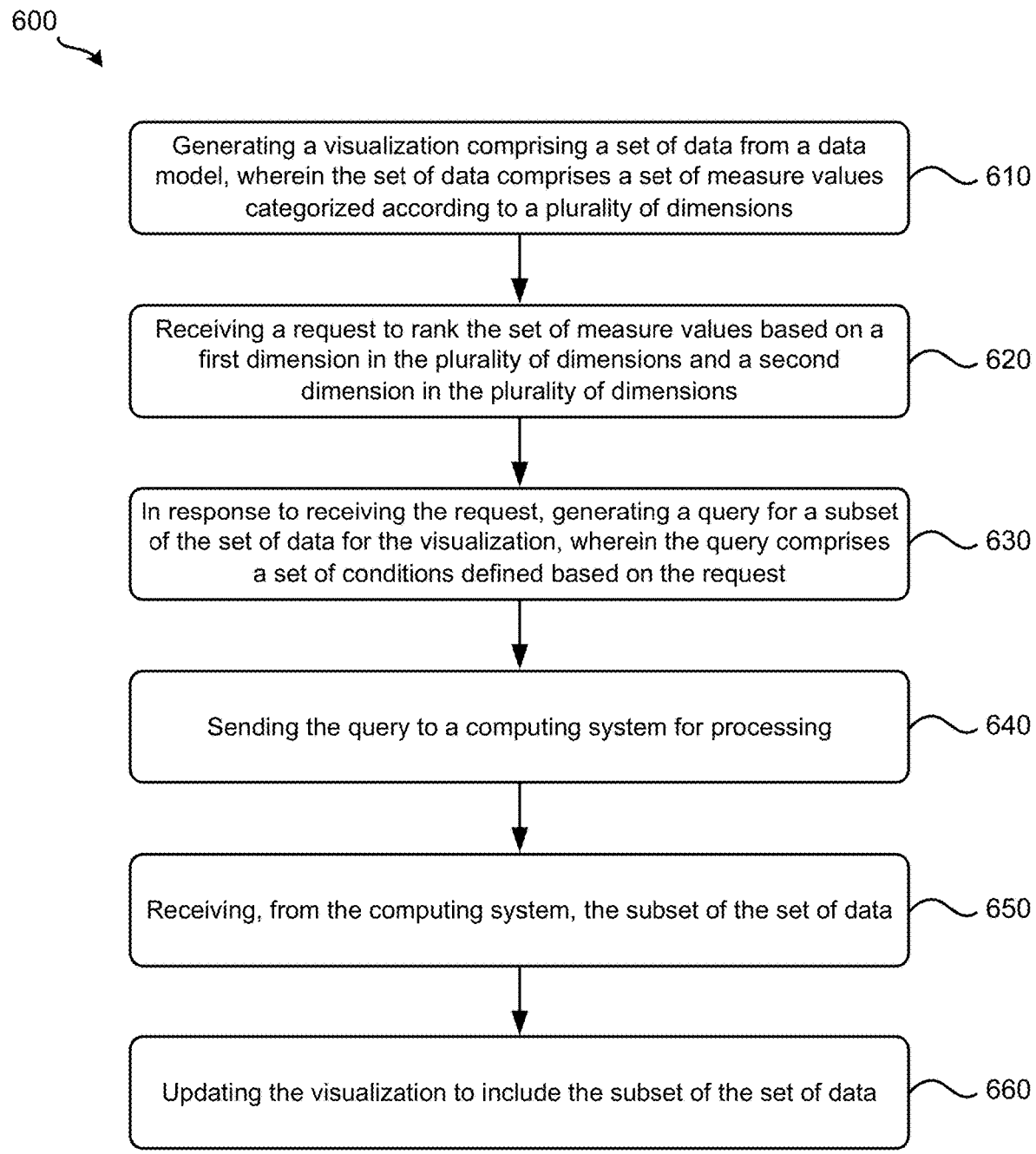
FIG. 6 illustrates a process for ranking of data in a visualization based on dimensions according to some embodiments.

FIG. 6 illustrates a process 600 for ranking of data in a visualization based on dimensions according to some embodiments. In some embodiments, client device 105 performs process 600. Process 600 begins by generating, at 610, a visualization comprising a set of data from a data model. The set of data comprises a set of measure values categorized according to a plurality of dimensions. Referring to FIGS. 1 and 2B as an example, UI manager 110 generates visualization 210 with the set of data that includes data organized according to a revenue measure, a product dimension), and a region dimension.

Next, process 600 receives, at 620, a request to rank the set of measure values based on a first dimension in the plurality of dimensions and a second dimension in the plurality of dimensions. Referring to FIGS. 1 and 2C as an example, computing system 125 receives the request in the form of a selection of the "Top 3" option in option panel 255. The "Top 3" option is for displaying the highest three revenue measure values categorized according to the product and region dimensions.

In response to receiving the request, process 600 then generates, at 630, a query for a subset of the set of data for the visualization. The query comprises a set of conditions defined based on the request. Referring to FIGS. 1 and 3 as an example, UI manager 110 determines that the user input indicates a modification to visualization 210 in a manner that changes the underlying data of visualization 210. As such, UI manager 110 forwards the user input to data manager 115. In response to receiving the user input from UI manager 110, data manager 115 accesses query models storage 120 to retrieve a query model associated with visualization 210. Based on the user input, data manager 115 modifies the query model associated with visualization 210 so that the query model includes the selected rank option. Next, data manager 115 generates query 300 based on the query model.

At 640, process 600 sends the query to a computing system for processing. Referring to FIGS. 1 and 3 as an example, data manager 115 sends query 300 to application 130. In response, application 130 forwards query 300 to query processor 135 for processing. Upon receiving query 300, query processor 135 executes query 300 by accessing application data storage 145 and retrieving the data specified in the query. Here, query processor 135 retrieves from application data storage 145 the highest three revenue measure values categorized according to the product and region dimensions. Query processor 135 sends these three measure values to application 130.

Next, process 600 receives, at 650, from the computing system, the subset of the set of data. Referring to FIG. 1 as an example, data manager 115 receives the three measure values from application 130. Once data manager 115 receives the data, data manager 115 sends it to UI manager 110.

Finally, process 600 updates, at 660, the visualization to include the subset of the set of data. Referring to FIGS. 1 and 2D as an example, UI manager 110 updates visualization 210 to include the newly received data. FIG. 2D illustrates GUI 200 after UI manager 110 updates visualization 210 with the newly received data.

Figure 7:
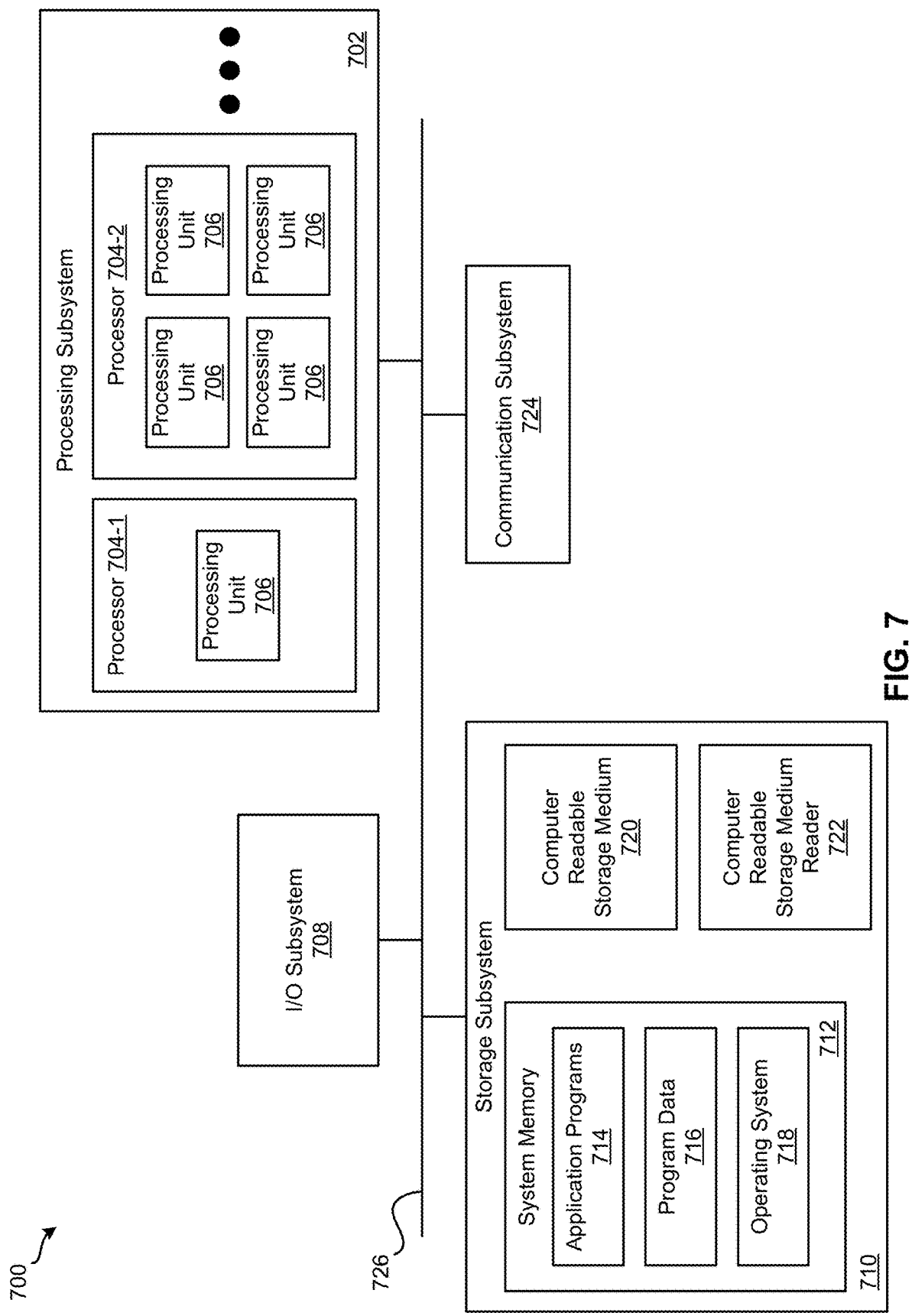
FIG. 7 illustrates an exemplary computer system, in which various embodiments may be implemented.

FIG. 7 illustrates an exemplary computer system 700 for implementing various embodiments described above. For example, computer system 700 may be used to implement client device 105 and computing system 125. Computer system 700 may be a desktop computer, a laptop, a server computer, or any other type of computer system or combination thereof. Some or all elements of UI manager 110, data manager 115, application 130, query processor 135, or combinations thereof can be included or implemented in computer system 700. In addition, computer system 700 can implement many of the operations, methods, and/or processes described above (e.g., process 600). As shown in FIG. 7, computer system 700 includes processing subsystem 702, which communicates, via bus subsystem 726, with input/output (I/O) subsystem 708, storage subsystem 710 and communication subsystem 724.

Bus subsystem 726 is configured to facilitate communication among the various components and subsystems of computer system 700. While bus subsystem 726 is illustrated in FIG. 7 as a single bus, one of ordinary skill in the art will understand that bus subsystem 726 may be implemented as multiple buses. Bus subsystem 726 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Extended ISA (EISA) bus, a Video Electronics Standards Association (VESA) local bus, a Peripheral Component Interconnect (PCI) bus, a Universal Serial Bus (USB), etc.

Processing subsystem 702, which can be implemented as one or more integrated circuits (e.g., a conventional microprocessor or microcontroller), controls the operation of computer system 700. Processing subsystem 702 may include one or more processors 704. Each processor 704 may include one processing unit 706 (e.g., a single core processor such as processor 704-1) or several processing units 706 (e.g., a multicore processor such as processor 704-2). In some embodiments, processors 704 of processing subsystem 702 may be implemented as independent processors while, in other embodiments, processors 704 of processing subsystem 702 may be implemented as multiple processors integrate into a single chip or multiple chips. Still, in some embodiments, processors 704 of processing subsystem 702 may be implemented as a combination of independent processors and multiple processors integrated into a single chip or multiple chips.

In some embodiments, processing subsystem 702 can execute a variety of programs or processes in response to program code and can maintain multiple concurrently executing programs or processes. At any given time, some or all of the program code to be executed can reside in processing subsystem 702 and/or in storage subsystem 710. Through suitable programming, processing subsystem 702 can provide various functionalities, such as the functionalities described above by reference to process 600.

I/O subsystem 708 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 700 to a user or another device (e.g., a printer).

As illustrated in FIG. 7, storage subsystem 710 includes system memory 712, computer-readable storage medium 720, and computer-readable storage medium reader 722. System memory 712 may be configured to store software in the form of program instructions that are loadable and executable by processing subsystem 702 as well as data generated during the execution of program instructions. In some embodiments, system memory 712 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 712 may include different types of memory, such as static random access memory (SRAM) and/or dynamic random access memory (DRAM). System memory 712 may include a basic input/output system (BIOS), in some embodiments, that is configured to store basic routines to facilitate transferring information between elements within computer system 700 (e.g., during start-up). Such a BIOS may be stored in ROM (e.g., a ROM chip), flash memory, or any other type of memory that may be configured to store the BIOS.

As shown in FIG. 7, system memory 712 includes application programs 714 (e.g., application 130), program data 716, and operating system (OS) 718. OS 718 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 720 may be a non-transitory computer-readable medium configured to store software (e.g., programs, code modules, data constructs, instructions, etc.). Many of the components (e.g., UI manager 110, data manager 115, application 130, and query processor 135) and/or processes (e.g., process 600) described above may be implemented as software that when executed by a processor or processing unit (e.g., a processor or processing unit of processing subsystem 702) performs the operations of such components and/or processes. Storage subsystem 710 may also store data used for, or generated during, the execution of the software.

Storage subsystem 710 may also include computer-readable storage medium reader 722 that is configured to communicate with computer-readable storage medium 720. Together and, optionally, in combination with system memory 712, computer-readable storage medium 720 may comprehensively represent remote, local, fixed, and/or removable storage devices plus storage media for temporarily and/or more permanently containing, storing, transmitting, and retrieving computer-readable information.

Computer-readable storage medium 720 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSDs), flash memory card (e.g., secure digital (SD) cards, CompactFlash cards, etc.), USB flash drives, or any other type of computer-readable storage media or device.

Communication subsystem 724 serves as an interface for receiving data from, and transmitting data to, other devices, computer systems, and networks. For example, communication subsystem 724 may allow computer system 700 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 724 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 724 may provide components configured for wired communication (e.g., Ethernet) in addition to or instead of components configured for wireless communication.

One of ordinary skill in the art will realize that the architecture shown in FIG. 7 is only an example architecture of computer system 700, and that computer system 700 may have additional or fewer components than shown, or a different configuration of components. The various components shown in FIG. 7 may be implemented in hardware, software, firmware or any combination thereof, including one or more signal processing and/or application specific integrated circuits.

Figure 8:
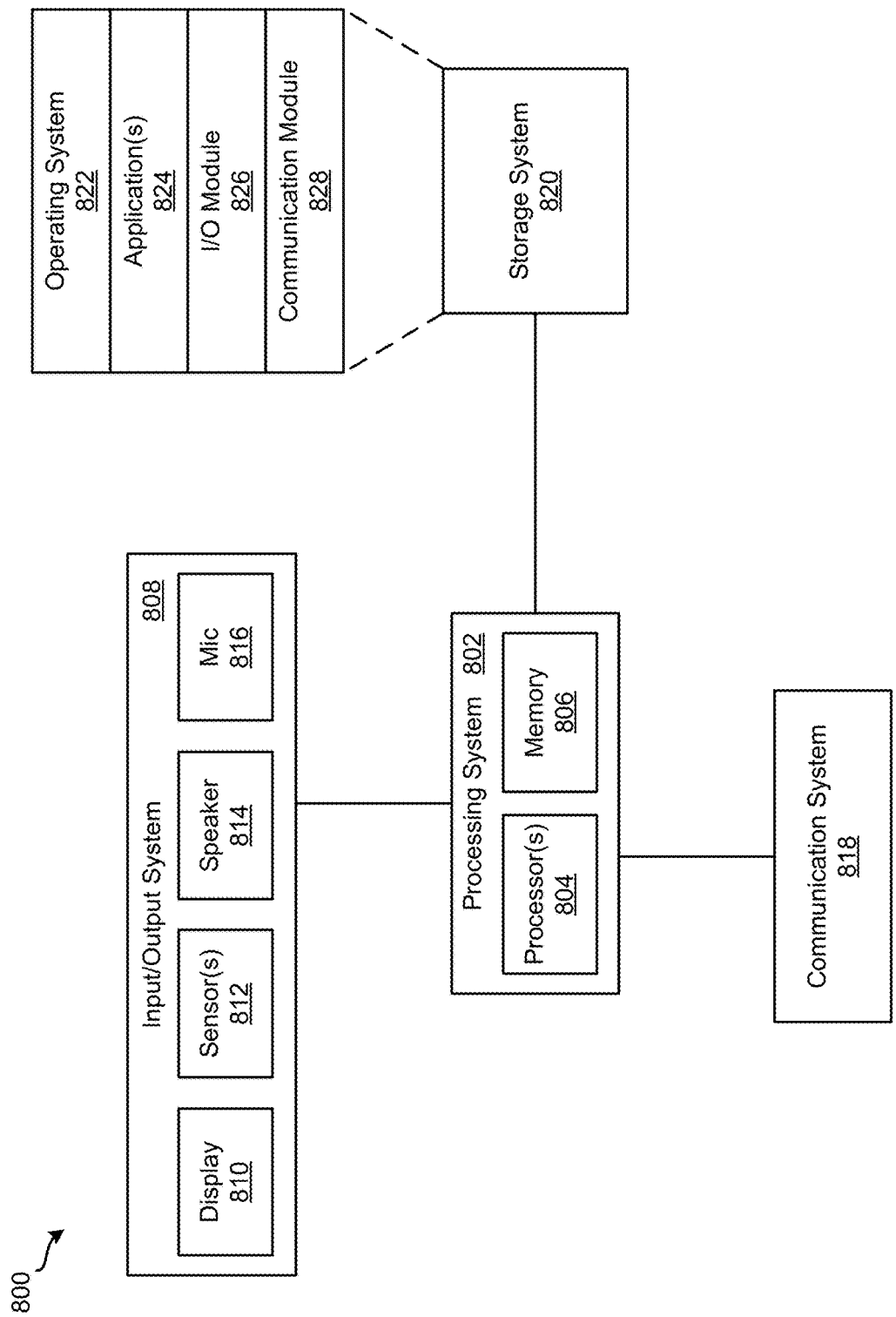
FIG. 8 illustrates an exemplary computing device, in which various embodiments may be implemented.

FIG. 8 illustrates an exemplary computing device 800 for implementing various embodiments described above. For example, computing device 800 may be used to implement client device 105. Computing device 800 may be a cellphone, a smartphone, a wearable device, an activity tracker or manager, a tablet, a personal digital assistant (PDA), a media player, or any other type of mobile computing device or combination thereof. Some or all elements of UI manager 110, data manager 115, or combinations thereof can be included or implemented in computing device 800. In addition, computing device 800 can implement many of the operations, methods, and/or processes described above (e.g., process 600). As shown in FIG. 8, computing device 800 includes processing system 802, input/output (I/O) system 808, communication system 818, and storage system 820. These components may be coupled by one or more communication buses or signal lines.

Processing system 802, which can be implemented as one or more integrated circuits (e.g., a conventional microprocessor or microcontroller), controls the operation of computing device 800. As shown, processing system 802 includes one or more processors 804 and memory 806. Processors 804 are configured to run or execute various software and/or sets of instructions stored in memory 806 to perform various functions for computing device 800 and to process data.

Each processor of processors 804 may include one processing unit (e.g., a single core processor) or several processing units (e.g., a multicore processor). In some embodiments, processors 804 of processing system 802 may be implemented as independent processors while, in other embodiments, processors 804 of processing system 802 may be implemented as multiple processors integrated into a single chip. Still, in some embodiments, processors 804 of processing system 802 may be implemented as a combination of independent processors and multiple processors integrated into a single chip.

Memory 806 may be configured to receive and store software (e.g., operating system 822, applications 824, I/O module 826, communication module 828, etc. from storage system 820) in the form of program instructions that are loadable and executable by processors 804 as well as data generated during the execution of program instructions. In some embodiments, memory 806 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 808 is responsible for receiving input through various components and providing output through various components. As shown for this example, I/O system 808 includes display 810, one or more sensors 812, speaker 814, and microphone 816. Display 810 is configured to output visual information (e.g., a graphical user interface (GUI) generated and/or rendered by processors 804). In some embodiments, display 810 is a touch screen that is configured to also receive touch-based input. Display 810 may be implemented using liquid crystal display (LCD) technology, light-emitting diode (LED) technology, organic LED (OLED) technology, organic electro luminescence (OEL) technology, or any other type of display technologies. Sensors 812 may include any number of different types of sensors for measuring a physical quantity (e.g., temperature, force, pressure, acceleration, orientation, light, radiation, etc.). Speaker 814 is configured to output audio information and microphone 816 is configured to receive audio input. One of ordinary skill in the art will appreciate that I/O system 808 may include any number of additional, fewer, and/or different components. For instance, I/O system 808 may include a keypad or keyboard for receiving input, a port for transmitting data, receiving data and/or power, and/or communicating with another device or component, an image capture component for capturing photos and/or videos, etc.

Communication system 818 serves as an interface for receiving data from, and transmitting data to, other devices, computer systems, and networks. For example, communication system 818 may allow computing device 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 818 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 818 may provide components configured for wired communication (e.g., Ethernet) in addition to or instead of components configured for wireless communication.

Storage system 820 handles the storage and management of data for computing device 800. Storage system 820 may be implemented by one or more non-transitory machine-readable mediums that are configured to store software (e.g., programs, code modules, data constructs, instructions, etc.) and store data used for, or generated during, the execution of the software. Many of the components (e.g., UI manager 110 and data manager 115) and/or processes (e.g., process 600) described above may be implemented as software that when executed by a processor or processing unit (e.g., processors 804 of processing system 802) performs the operations of such components and/or processes.

In this example, storage system 820 includes operating system 822, one or more applications 824, I/O module 826, and communication module 828. Operating system 822 includes various procedures, sets of instructions, software components and/or drivers for controlling and managing general system tasks (e.g., memory management, storage device control, power management, etc.) and facilitates communication between various hardware and software components. Operating system 822 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 824 can include any number of different applications installed on computing device 800. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 826 manages information received via input components (e.g., display 810, sensors 812, and microphone 816) and information to be outputted via output components (e.g., display 810 and speaker 814). Communication module 828 facilitates communication with other devices via communication system 818 and includes various software components for handling data received from communication system 818.

One of ordinary skill in the art will realize that the architecture shown in FIG. 8 is only an example architecture of computing device 800, and that computing device 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
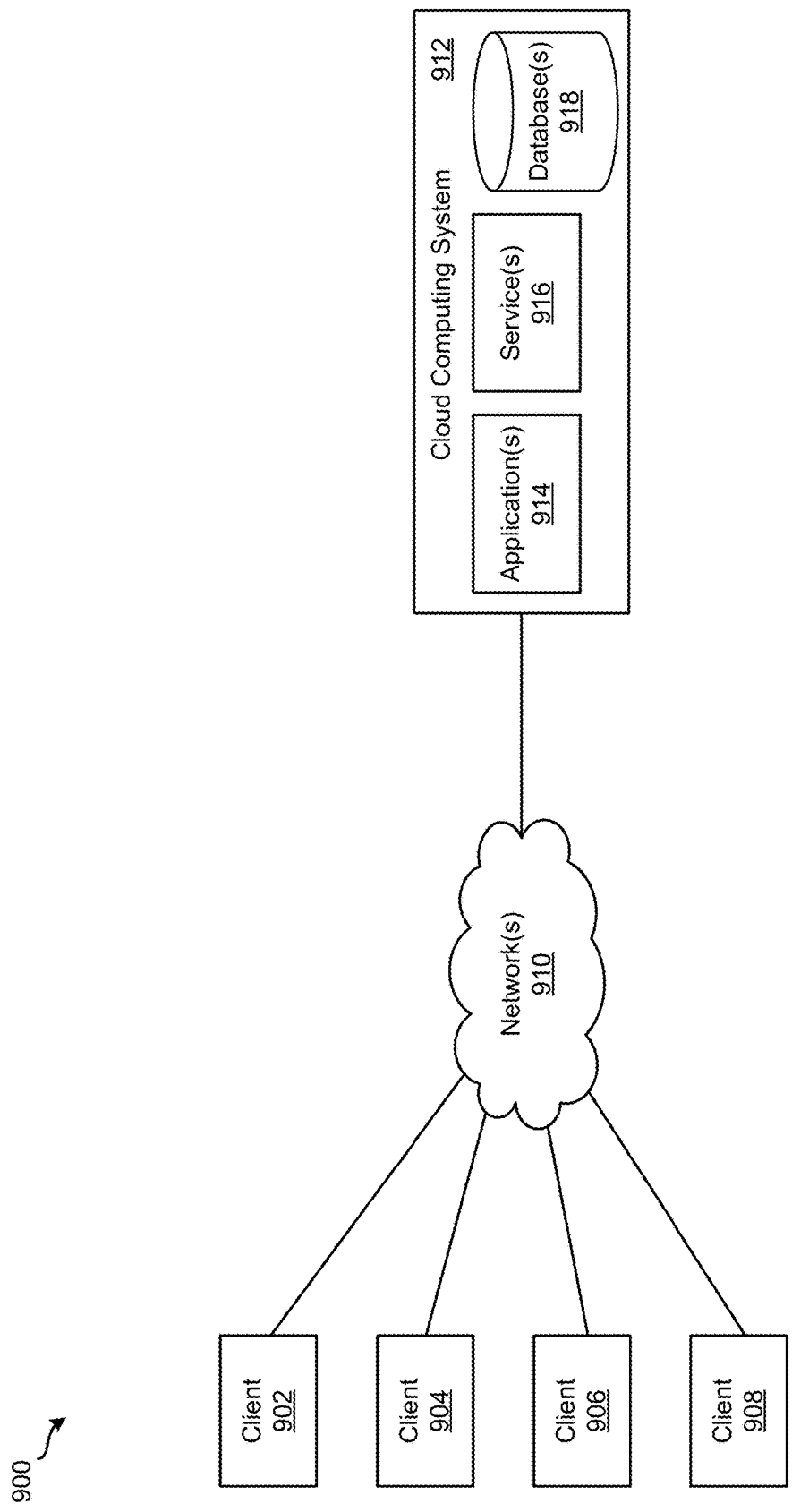
FIG. 9 illustrates an exemplary system, in which various embodiments may be implemented.

FIG. 9 illustrates an exemplary system 900 for implementing various embodiments described above. For example, any of client devices 902-908 may be used to implement client device 105 and cloud computing system 912 may be used to implement computing system 125. As shown, system 900 includes client devices 902-908, one or more networks 910, and cloud computing system 912. Cloud computing system 912 is configured to provide resources and data to client devices 902-908 via networks 910. In some embodiments, cloud computing system 912 provides resources to any number of different users (e.g., customers, tenants, organizations, etc.). Cloud computing system 912 may be implemented by one or more computer systems (e.g., servers), virtual machines operating on a computer system, or a combination thereof.

As shown, cloud computing system 912 includes one or more applications 914, one or more services 916, and one or more databases 918. Cloud computing system 912 may provide applications 914, services 916, and databases 918 to any number of different customers in a self-service, subscription-based, elastically scalable, reliable, highly available, and secure manner.

In some embodiments, cloud computing system 912 may be adapted to automatically provision, manage, and track a customer's subscriptions to services offered by cloud computing system 912. Cloud computing system 912 may provide cloud services via different deployment models. For example, cloud services may be provided under a public cloud model in which cloud computing system 912 is owned by an organization selling cloud services and the cloud services are made available to the general public or different industry enterprises. As another example, cloud services may be provided under a private cloud model in which cloud computing system 912 is operated solely for a single organization and may provide cloud services for one or more entities within the organization. The cloud services may also be provided under a community cloud model in which cloud computing system 912 and the cloud services provided by cloud computing system 912 are shared by several organizations in a related community. The cloud services may also be provided under a hybrid cloud model, which is a combination of two or more of the aforementioned different models.

In some instances, any one of applications 914, services 916, and databases 918 made available to client devices 902-908 via networks 910 from cloud computing system 912 is referred to as a "cloud service." Typically, servers and systems that make up cloud computing system 912 are different from the on-premises servers and systems of a customer. For example, cloud computing system 912 may host an application and a user of one of client devices 902-908 may order and use the application via networks 910.

Applications 914 may include software applications that are configured to execute on cloud computing system 912 (e.g., a computer system or a virtual machine operating on a computer system) and be accessed, controlled, managed, etc. via client devices 902-908. In some embodiments, applications 914 may include server applications and/or mid-tier applications (e.g., HTTP (hypertext transfer protocol) server applications, FTP (file transfer protocol) server applications, CGI (common gateway interface) server applications, JAVA server applications, etc.). Services 916 are software components, modules, application, etc. that are configured to execute on cloud computing system 912 and provide functionalities to client devices 902-908 via networks 910. Services 916 may be web-based services or on-demand cloud services.

Databases 918 are configured to store and/or manage data that is accessed by applications 914, services 916, and/or client devices 902-908. For instance, storages 140 and 145 may be stored in databases 918. Databases 918 may reside on a non-transitory storage medium local to (and/or resident in) cloud computing system 912, in a storage-area network (SAN), on a non-transitory storage medium local located remotely from cloud computing system 912. In some embodiments, databases 918 may include relational databases that are managed by a relational database management system (RDBMS). Databases 918 may be a column-oriented databases, row-oriented databases, or a combination thereof. In some embodiments, some or all of databases 918 are in-memory databases. That is, in some such embodiments, data for databases 918 are stored and managed in memory (e.g., random access memory (RAM)).

Client devices 902-908 are configured to execute and operate a client application (e.g., a web browser, a proprietary client application, etc.) that communicates with applications 914, services 916, and/or databases 918 via networks 910. This way, client devices 902-908 may access the various functionalities provided by applications 914, services 916, and databases 918 while applications 914, services 916, and databases 918 are operating (e.g., hosted) on cloud computing system 912. Client devices 902-908 may be computer system 700 or computing device 800, as described above by reference to FIGS. 7 and 8, respectively. Although system 900 is shown with four client devices, any number of client devices may be supported.

Networks 910 may be any type of network configured to facilitate data communications among client devices 902-908 and cloud computing system 912 using any of a variety of network protocols. Networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
generating, on a client computer, a visualization comprising a set of data from a data model, wherein the set of data comprises a set of measure values categorized according to a plurality of dimensions;
receiving, on the client computer, a request to rank the set of measure values based on a first dimension in the plurality of dimensions and a second dimension in the plurality of dimensions;
modifying, on the client computer, a query model associated with the visualization so that the query model includes the rank;
in response to receiving the request, generating, on the client computer, a query for a subset of the set of data for the visualization, wherein the query comprises a set of conditions defined based on the request, the conditions comprising at least one threshold attribute specifying the rank;
sending the query to a second computing system for processing;
receiving, on the client computer from the second computing system, the subset of the set of data comprising only the ranked set of measure values; and
updating the visualization on the client computer to include the subset of the set of data,
wherein the request specifies to rank the set of measure values based on the first dimension and the second dimension separately, and
wherein the set of conditions comprises a first condition specifying to evaluate measure values based on the first dimension and a second condition specifying to evaluate measure values based on the second dimension.

2. The non-transitory machine-readable medium of claim 1, wherein the request specifies to rank the set of measure values based on the first dimension and the second dimension together.

3. The non-transitory machine-readable medium of claim 2, wherein the set of conditions comprises a condition specifying to evaluate measure values based on the first dimension and the second dimension.

4. The non-transitory machine-readable medium of claim 1, wherein receiving the request comprises receiving, through a graphical user interface (GUI) provided by the client computer, a selection of a rank option.

5. The non-transitory machine-readable medium of claim 4, wherein receiving, through the GUI, the selection of the rank option comprises:
receiving a first selection of a first rank option for the first dimension in the plurality of dimensions; and
receiving a second selection of a second rank option for the second dimension in the plurality of dimensions.

6. A method comprising:
generating a visualization comprising a set of data from a data model, wherein the set of data comprises a set of measure values categorized according to a plurality of dimensions;
generating, on a client computer, a visualization comprising a set of data from a data model, wherein the set of data comprises a set of measure values categorized according to a plurality of dimensions;
receiving, on the client computer, a request to rank the set of measure values based on a first dimension in the plurality of dimensions and a second dimension in the plurality of dimensions;
modifying, on the client computer, a query model associated with the visualization so that the query model includes the rank;
in response to receiving the request, generating, on the client computer, a query for a subset of the set of data for the visualization, wherein the query comprises a set of conditions defined based on the request, the conditions comprising at least one threshold attribute specifying the rank;
sending the query to a second computing system for processing;
receiving, on the client computer from the second computing system, the subset of the set of data comprising only the ranked set of measure values; and
updating the visualization on the client computer to include the subset of the set of data,
wherein the request specifies to rank the set of measure values based on the first dimension and the second dimension separately, and
wherein the set of conditions comprises a first condition specifying to evaluate measure values based on the first dimension and a second condition specifying to evaluate measure values based on the second dimension.

7. The method of claim 6, wherein the request specifies to rank the set of measure values based on the first dimension and the second dimension together.

8. The method of claim 7, wherein the set of conditions comprises a condition specifying to evaluate measure values based on the first dimension and the second dimension.

9. The method of claim 6, wherein receiving the request comprises receiving, through a graphical user interface (GUI) provided by the client computer, a selection of a rank option.

10. The method of claim 9, wherein receiving, through the GUI, the selection of the rank option comprises:

receiving a first selection of a first rank option for the first dimension in the plurality of dimensions; and receiving a second selection of a second rank option for the second dimension in the plurality of dimensions.

11. A system comprising:

a set of processing units; and a non-transitory machine-readable medium storing instructions that when executed by at least one processing unit in the set of processing units cause the at least one processing unit to:

generate, on a client computer, a visualization comprising a set of data from a data model, wherein the set of data comprises a set of measure values categorized according to a plurality of dimensions;

receive, on the client computer, a request to rank the set of measure values based on a first dimension in the plurality of dimensions and a second dimension in the plurality of dimensions;

modify, on the client computer, a query model associated with the visualization so that the query model includes the rank;

in response to receiving the request, generate, on the client computer, a query for a subset of the set of data for the visualization, wherein the query comprises a set of conditions defined based on the request, the conditions comprising at least one threshold attribute specifying the rank;

send the query to a second computing system for processing;

receive, on the client computer from the second computing system, the subset of the set of data comprising only the ranked set of measure values; and update the visualization on the client computer to include the subset of the set of data, wherein the request specifies to rank the set of measure values based on the first dimension and the second dimension separately, and wherein the set of conditions comprises a first condition specifying to evaluate measure values based on the first dimension and a second condition specifying to evaluate measure values based on the second dimension.

12. The system of claim 11, wherein the request specifies to rank the set of measure values based on the first dimension and the second dimension together.

13. The system of claim 12, wherein the set of conditions comprises a condition specifying to evaluate measure values based on the first dimension and the second dimension.

14. The system of claim 11, wherein receiving the request comprises receiving, through a graphical user interface (GUI) provided by the client computer, a selection of a rank option.

* * * * *